United States Patent

Mitarai et al.

[11] Patent Number: 5,625,551
[45] Date of Patent: Apr. 29, 1997

[54] FEEDBACK CONTROLLER

[75] Inventors: Reiji Mitarai, Hachioji; Hiroaki Takeishi, Yokohama; Isao Iwai, Kodaira, all of Japan

[73] Assignee: Canon Kabushiki Kaisha, Tokyo, Japan

[21] Appl. No.: 363,956

[22] Filed: Dec. 27, 1994

[30] Foreign Application Priority Data

Dec. 28, 1993 [JP] Japan .................... 5-337246

[51] Int. Cl.⁶ .................... G05B 13/04
[52] U.S. Cl. .................... 364/149; 364/176
[58] Field of Search .................... 364/148, 149–151, 364/157, 158, 159, 164, 165, 176, 152; 318/561

[56] References Cited

U.S. PATENT DOCUMENTS

| | | | |
|---|---|---|---|
| 3,795,799 | 3/1974 | Courtiol | 364/150 |
| 4,151,589 | 4/1979 | Ross | 364/149 X |
| 4,195,337 | 3/1980 | Bertrand et al. | 364/151 |
| 4,338,659 | 7/1982 | Kurakake | 364/150 X |
| 4,769,766 | 9/1988 | Tung | 364/149 |
| 5,091,843 | 2/1992 | Peczkowski | 364/164 X |
| 5,195,028 | 3/1993 | Hiroi | 364/176 X |
| 5,444,612 | 8/1995 | Torii et al. | 364/176 X |
| 5,483,439 | 1/1996 | Ono et al. | 364/149 |

*Primary Examiner*—Joseph Ruggiero
*Attorney, Agent, or Firm*—Fitzpatrick, Cella, Harper & Scinto

[57] ABSTRACT

A high-performance feedback controller having both a target value followability and a disturbance suppression characteristic is provided, and its characteristic arrangement is as follows. In a feedback controller, which receives a target value r and a controlled variable y and supplies a manipulated variable u as a calculation output to a control object which has at least one input u as a manipulated variable and at least one output y as a controlled variable, a compensator $G_c(s)$, whose internal calculation arrangement is given by $G_c(s)=\alpha/\{G_n(0)-G_n(s)\}$ using a nominal model $G_n(s)$ as an approximate characteristic of the control object and an arbitrary positive parameter $\alpha$, performs a compensation of a comparison deviation ($e=r-y$) between the target value r and the controlled variable y.

5 Claims, 4 Drawing Sheets

FEEDBACK CONTROLLER

BACKGROUND OF THE INVENTION

1. Field of the Invention

The present invention relates to a feedback controller which can be utilized in many industrial fields, and can quickly match a controlled variable with a target value.

2. Related Background Art

Figure 2:
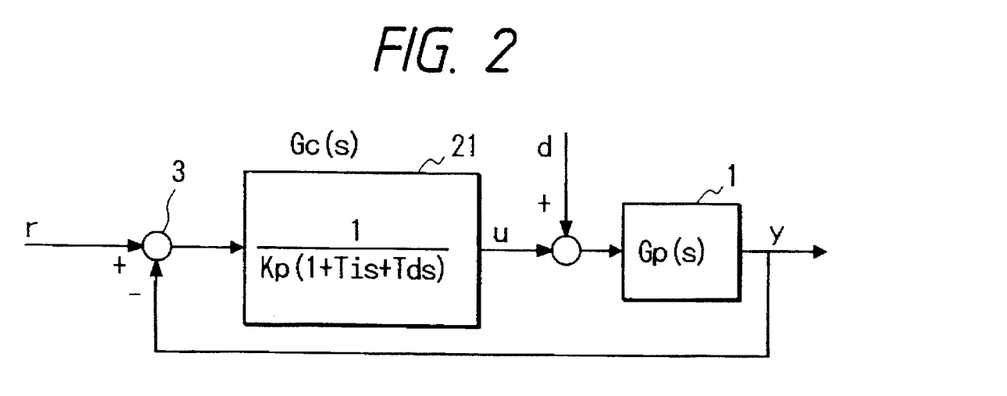
FIG. 2 is a diagram showing a conventional PID control system.

As a representative system of conventional feedback techniques, a feedback controller which uses a PID compensator shown in FIG. 2 is known. Note that the PID compensator is generally a compensator which combines proportional, integral, and derivative operations. A deviation between a target value r and a controlled variable y obtained by a comparator 3 is an input to a PID compensator 21, and the result of the compensation calculation is output as a manipulated variable u to be supplied to a control object.

PID control (normally, PI since most objects have no gain in a high-frequency range) is practically good control system design means since it is simple, has a high-gain characteristic in a low-frequency range, and so on, and the PID control is used in many fields in practice. However, since the PID control adopts a fixed operation system, control performance obtained by this control is limited, and a required characteristic design cannot be obtained for an object having a certain characteristic.

Figure 3:
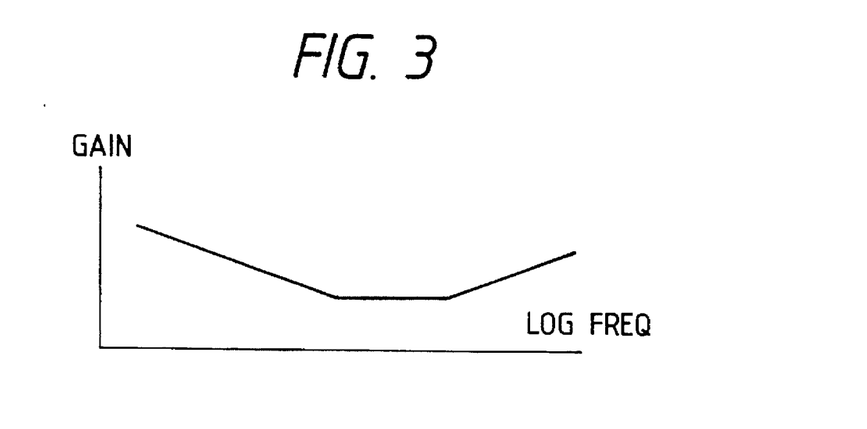
FIG. 3 is a graph showing the frequency characteristic of a PID control calculator.

The PID compensator has a linear gain characteristic having one deflection point as PI and two deflection points as PID when the frequency characteristic is considered by approximation, as shown in FIG. 3. In general, in order to improve the control characteristic, shaping of the frequency characteristic near a phase crossover frequency of an open-loop transfer function is important. In most cases, a problem of characteristic adjustment in this frequency range remains unsolved. More specifically, a delicate characteristic design in this frequency range influences all control effects aiming at an increase in gain, an increase in upper limit of the control band, and provision of a proper attenuation characteristic, and the like.

When a further characteristic improvement is required in a PID controller which has no degree of freedom of fine frequency shaping, a filter element such as a phase compensator is added in a conventional system. However, this method largely depends on the experiences of a designer, and trials and errors as multi-dimensional search processing associated with adjustment of a plurality of parameters are inevitable. This is well known as a problem of classical control techniques.

In characteristic shaping in a specific frequency region, there is no clear guideline as to its relation with the time-domain response, and as a result, a plurality of gain-phase compensation elements must be combined and added. Operations associated with such a design are repetitions of off-line design calculations and simulations, and require skills of the designer. Achieving such a design by only simple design calculations and on-line adjustment on actual machines is thus desired.

As described above, in the conventional techniques based on PID control, design jobs offer very poor prospects and require high operation cost except for simple control problems.

As described above, the conventional techniques cannot easily perform fine characteristic adjustment near a phase crossover frequency on the frequency characteristic. In the conventional technique which must adopt a control characteristic design method with a poor prospect, i.e., must combine various compensation elements based on PID compensation, high cost associated with characteristic adjustment is required.

When high control performance is to be obtained, a controller generally requires a complicated arrangement or high-order compensation calculations. This results in an increase in the number of parameters to be set, and hence, it becomes difficult to set and adjust them. The obtained result exhibits poor control performance, and poor maintainability associated with, e.g., re-adjustment upon aging of a control object is also a problem to be solved.

SUMMARY OF THE INVENTION

One aspect of the application is to provide a feedback controller, which receives a target value r and a controlled variable y and supplies a manipulated variable u as a calculation output to a control object which has at least one input u as a manipulated variable and at least one output y as a controlled variable, wherein a compensator $G_c(s)$, whose internal calculation arrangement is given by the following formula:

$$G_c(s)=\alpha/(G_n(0)-G_n(s))$$

a nominal model $G_n(s)$ as an approximate characteristic of the control object and an arbitrary positive parameter α, performs a compensation of a comparison deviation (e=r−y) between the target value r and the controlled variable y.

Other objects of the present invention will become apparent from the following description of the embodiments taken in conjunction with the accompanying drawings.

BRIEF DESCRIPTION OF THE DRAWINGS

FIGS. 7A and 7B show a numerical value example of the first embodiment, in which

DESCRIPTION OF THE PREFERRED EMBODIMENT

The principle of the present invention will be described below with reference to FIG. 4. In a stage prior to the control system design, some information associated with an input-output characteristic (transfer function) $G_p(s)$ of a control object has been acquired. This information is expressed as a nominal model $G_n(s)$. In other words, the control system design is to be performed while assuming the input/output relationship of the control object to be:

$$y = G_n(s)u \quad (1)$$

where u is the manipulated variable and y is the controlled variable. Needless to say, $G_p(s)$ is generally a nonlinear distributed parameter system characteristic, and is assumed to be an unknown characteristic.

The above-mentioned $G_n(s)$ is acquired from partial knowledge of $G_p(s)$.

Assume that the characteristic of a controller to be obtained is represented by $G_c(s)$ (transfer function). More specifically, the input/output relationship of the controller is represented by:

$$u = G_c(s)(r-y) \quad (2)$$

where r is the target value.

Easy determination of $G_c(s)$ from $G_n(s)$ is desired.

Figure 4:
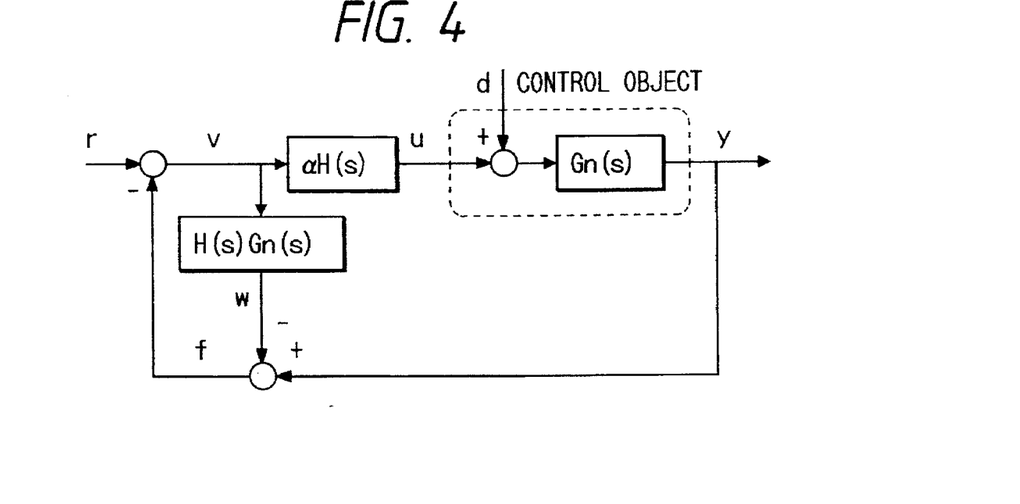
FIG. 4 is a diagram showing-the principle of the present invention.

A control system shown in FIG. 4 will be examined. H(s) is a transfer function satisfying the following relation:

$$H(j\omega)G_n(j\omega) = \begin{cases} 1 \ (\omega \to 0) \\ 0 \ (\omega \to \infty) \end{cases} \quad (3)$$

where the Laplace operator is given by s=jω (ω is the angular frequency).

H(s) can be easily selected, and for example, the following function is one of them.

$$H(s) = G_n^{-1}(0) \quad (4)$$

Normally, $G_n(s)$ is proper (has integral/integrals characteristic(s) in a high-frequency range), and satisfies a condition of relation (3) in the high-frequency range. In other words, H(s) is an approximate inverse characteristic model of $G_n(s)$ in a low-frequency range.

In order to briefly explain the meaning of FIG. 4, we assume:

$$G_p(s) = G_n(s), \alpha = 1 \quad (5)$$

A signal f in FIG. 4 is given by:

$$f = y - w = G_n(s)d \quad (6)$$

As can be seen from equation (6), the signal f represents the amount of influence imposed on the controlled variable by a disturbance d. If this signal is negatively fed back to an input point v, the following control law is obtained:

$$u = H(s)v = H(s)(r-f) = H(s)(r - G(s)d) \quad (7)$$

When the controlled variable y is calculated using this law, we have:

$$y = G_n(s)(u+d) = G_n(s)H(s)r\{1 - G_n(s)H(s)\}d \quad (8)$$

When the condition of relation (3) in the low-frequency range is used, equation (8) is rewritten as:

$$y = r \quad (9)$$

Equation (9) means that not only the influence component of d can be eliminated, but also that y has target value followability.

A brief description has been given so far under an assumption of equation (5). In order to give a more general description, the following two characteristic expressions of a control system are given:

$$G_r = \frac{\alpha H G_p}{1 + H(\alpha G_p - G_n)} \quad (10)$$

$$G_d = \frac{(1 - HG_n)G_p}{1 + H(\alpha G_p - G_n)} \quad (11)$$

where $G_r$ and $G_d$ are respectively the transfer functions from r to y and from d to y obtained in FIG. 4. When condition (3) is used for a frequency $\omega_b$ exhibiting a given frequency range, it is confirmed that equations (10) and (11) are respectively rewritten as follows in a low-frequency range:

$$G_r(j\omega) = 1, \ G_d(j\omega) = 0 (\omega << \omega_b) \quad (12)$$

and in a high-frequency range:

$$G_r(j\omega) = \frac{\alpha H G_p}{1 + \alpha H G_p}, \ G_d(j\omega) = \frac{G_p}{1 + \alpha H G_p} \ (\omega >> \omega_b) \quad (13)$$

Equations (12) guarantee that the transfer functions have target value followability and a disturbance elimination characteristic, and these characteristics are preferable ones of a control system as a general consideration. If $G_p$ is proper in equations (13), both $G_r$ and $G_d$ asymptotically approach zero, and are very strong against high-frequency noise, and the like. In practice, these characteristics are preserved in a frequency range covered by H(s) in association with the low-frequency range condition of relation (3).

Figure 5:
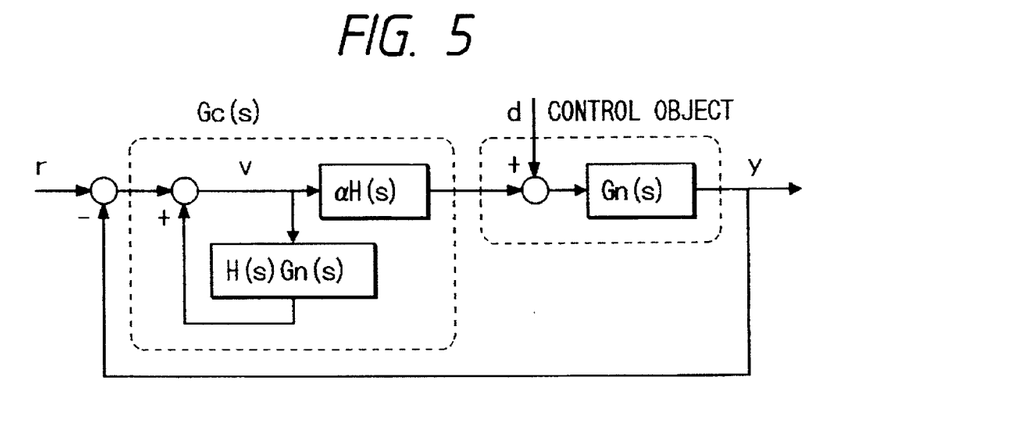
FIG. 5 is a diagram showing the third embodiment of the present invention.
Figure 6:
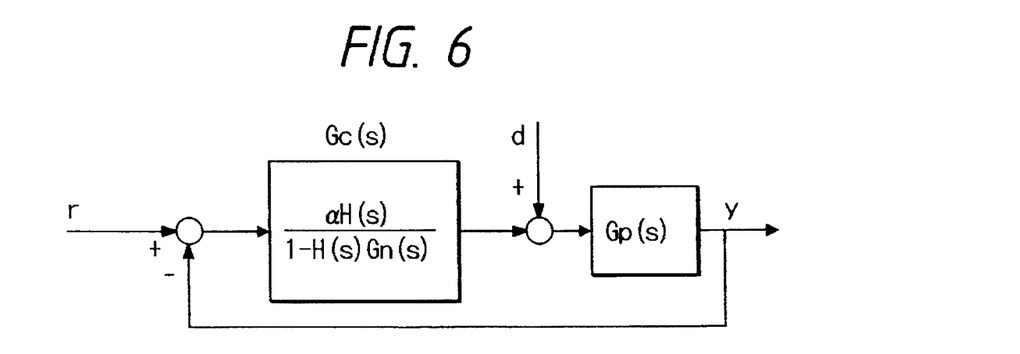
FIG. 6 is a diagram showing the second embodiment of the present invention.

FIGS. 5 and 6 showing embodiments of the present invention (to be described later) are obtained by equivalently transforming FIG. 4. From these figures, a controller having a desirable characteristic is given by:

$$G_c(s) = \frac{\alpha H(s)}{1 - H(s)G_n(s)} \quad (14)$$

(First Embodiment)

Figure 1:
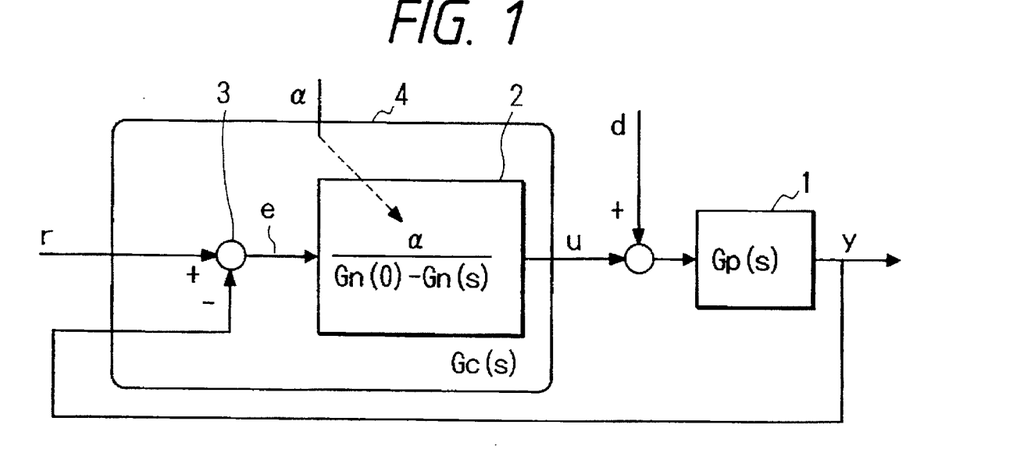
FIG. 1 is a diagram showing the first embodiment of the present invention.

FIG. 1 shows the first embodiment of the present invention. A control calculator (compensator) 2 is arranged at the input side of a control object 1 having a characteristic $G_p(s)$ to constitute a simple closed feedback loop as a whole. A comparison calculator 3 calculates a deviation between a target value r and a controlled variable y, and inputs the deviation to the compensator 2.

The control calculator 2 is a calculation having a transfer function given by:

$$G_c(s) = \frac{\alpha}{G_n(0) - G_n(s)} \quad (15)$$

where $G_n(s)$ is one model of the characteristic $G_p(s)$ of the object, which reflects an object characteristic to a high-frequency range as needed on the basis of a low-frequency range. s(=jω) is a Laplace operator, which can be considered to represent frequency. Therefore, $G_n(0)$ is the DC gain of $G_n(s)$, and is a characteristic parameter which can be most easily extracted from the control object. In addition, a is a positive constant, which is freely set within a range wherein the stability of the system is maintained. Note that an input d in FIG. 1 normally represents an unknown disturbance.

If equation (15) is expressed in correspondence with the above description of the principle, it is obtained by substituting equation (4) in equation (14). More specifically, the calculator 2 given by equation (15) is arranged in the feedback system shown in FIG. 1.

In order not to limit the description to a purely theoretical one, the effect of this embodiment will be exemplified using a simple numerical value example.

Assume that this embodiment is applied to an example in which a phase delay is expected to pose a problem:

$$G_p(s) = \frac{e^{-0.5s}}{1+s} \quad (16)$$

For this control object, for example, the following function is selected as a nominal model:

$$G_n(s) = \frac{1}{(1+s)(1+0.25s)^2} \quad (17)$$

This equation is obtained by approximating an idle time characteristic by a second-order linear delay element. Since the DC gain of equation (16) is unity, when equation (15) is calculated writing $G_n(0)=1$, equation (18) is obtained:

$$G_c(s) = \frac{\alpha(1+s)(1+0.25s)^2}{s(1.5+0.5625s+0.0625s^2)} \quad (18)$$

Figure 7A:
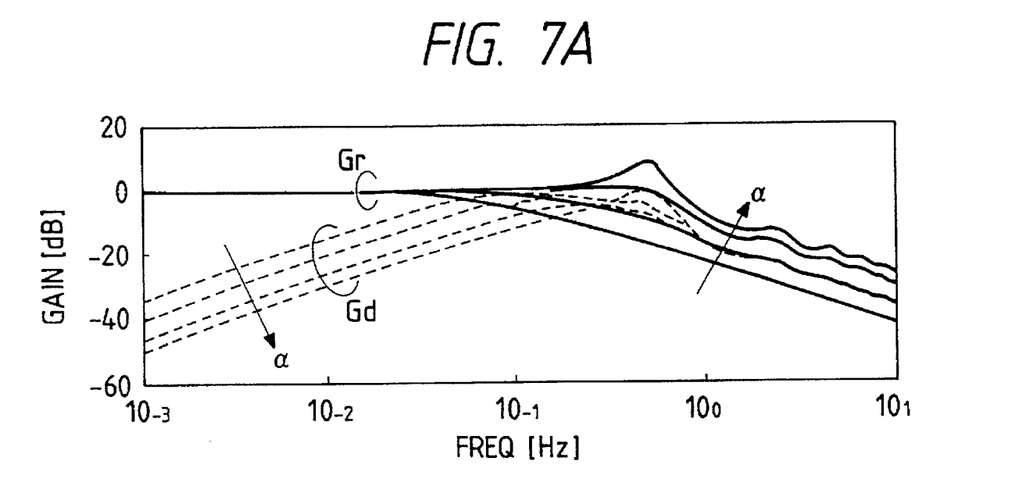
FIG. 7A is a graph showing the relationship between the frequency and the gain.
Figure 7B:
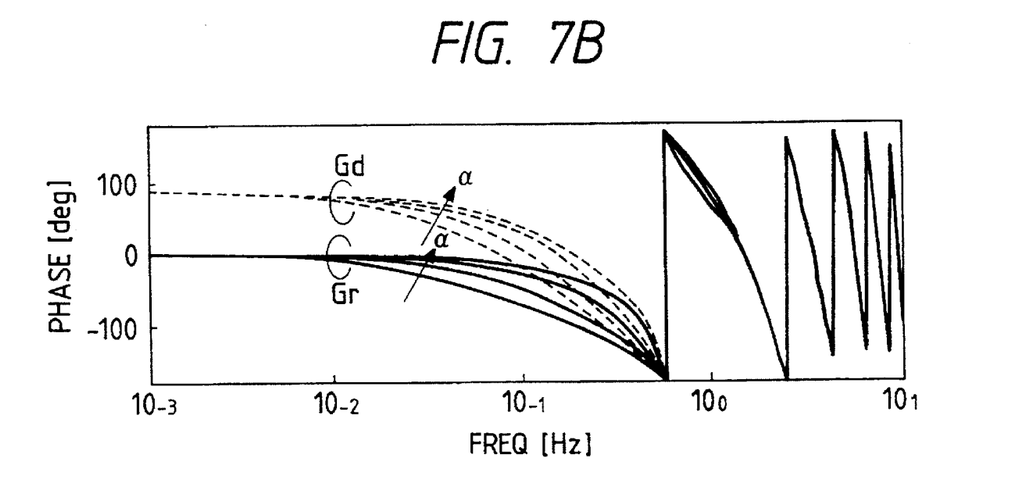
FIG. 7B is a graph showing the relationship between the frequency and the phase.
Figure 8A:
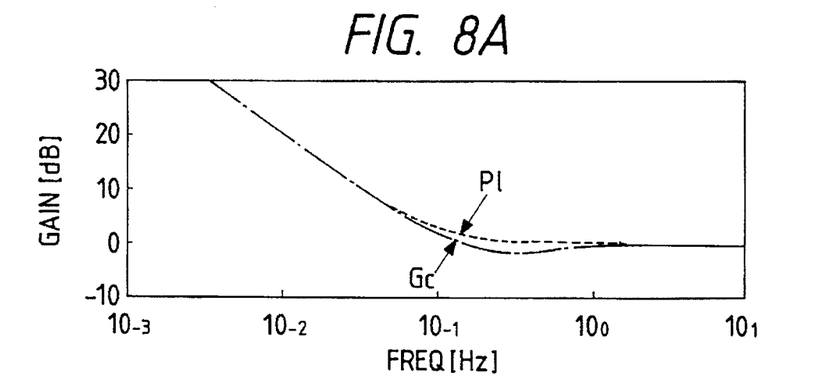
FIGS. 8A and 8B are graphs showing the frequency characteristic of a controller in the first embodiment.
Figure 8B:
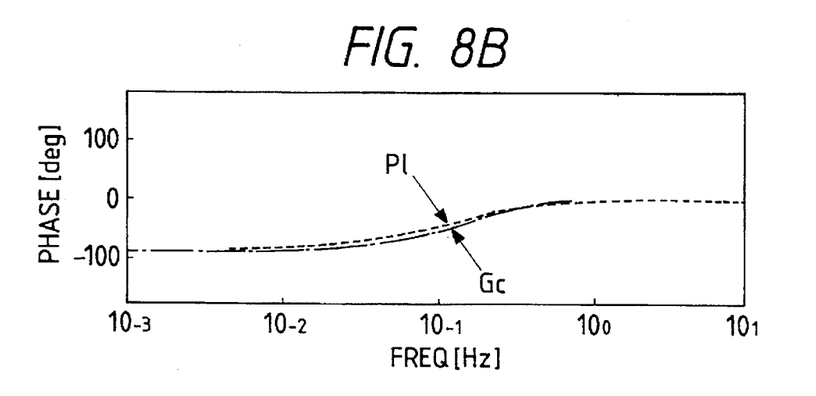
Figure 9:
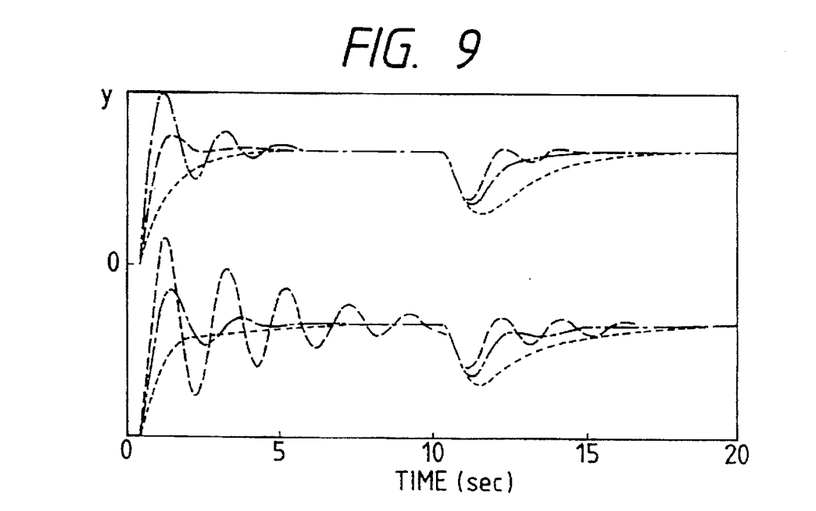
FIG. 9 is a graph showing the simulation results obtained using a numerical value example of the first embodiment.

In this manner, the control calculator can be obtained. The control characteristic (closed loop characteristic) using equation (18) will be examined as a curve representing a frequency characteristic. FIGS. 7A and 7B respectively show $G_r$ and $G_d$ as evaluations of the target value followability and the disturbance elimination characteristic given by equations (10) and (11) using a as a parameter. As can be seen from FIGS. 7A and 7B, a high loop gain can be set without disturbing the balance between the target value followability and the disturbance elimination characteristic using a single adjustable parameter α. FIGS. 8A and 8B show the frequency characteristic of the controller given by equation (18). For the purpose of comparison, FIGS. 8A and 8B also show the frequency characteristic of a PI controller obtained by approximation of equation (18). A slight difference is found in an intermediate-frequency range, and this difference contributes to an improvement of the closed loop characteristic. FIG. 9 shows the simulation results of this numerical value example for the purpose of confirmation. FIG. 9 shows the response waveforms of the controlled variable y when step inputs are given as a target value. Upper response waveforms in FIG. 9 are those obtained when equation (18) is used, and lower response waveforms in FIG. 9 are those obtained when the PI controller shown in FIGS. 8A and 8B is used. In these waveforms, the DC gain of the open-loop transfer function is used as a parameter, which is changed to 0.5, 1.0, and 2.0. As can be seen from FIG. 9, the PI controller tends to oscillate upon an increase in gain as compared to this embodiment.

As described above in this embodiment and its numerical value example, a control system design can be directly calculated from a nominal model of a control object in question. When only a controller is to be obtained, no special design calculations are required at all, and the arrangement of this embodiment can be equipped in an actual machine to quickly perform calculations up to a critical design using the adjustable parameter α.

(Second Embodiment)

The first embodiment described above exemplifies a most practical one of controller classes given by equation (14) in terms of simplicity. For a designer who has a good knowledge of transfer function evaluation in control system design, it is not difficult to set H(s) by extending the frequency range to a higher range.

In this embodiment, as shown in FIG. 6, a feedback controller having a controller given by equation (14) is arranged using a nominal model $G_n(s)$ and an inverse characteristic low-frequency approximation model H(s) of $G_n(s)$. As compared to a case wherein only the DC gain is used as H(s), a controller with a wider control band can be obtained.

(Third Embodiment)

When $G_c(s)$ is calculated using the inverse characteristic low-frequency approximation model H(s), since $G_c(s)$ itself has a high order, calculations become complicated. This embodiment aims at solving this problem, and uses low-order models $G_n(s)$ and H(s) in the controller without modification, as shown in FIG. 5.

As compared to the second embodiment, this embodiment allows easy maintenance. In particular, when control calculations are executed in a software manner, various kinds of H(s) can be easily set, and the degree of freedom in improving system characteristics can be effectively increased. Also, as another merit, no high-order differential calculations are required for a system with a large delay, and a controller having a characteristic equivalent to differential calculations can be easily obtained.

(Fourth Embodiment)

In this embodiment, a motion control system using an ultrasonic wave motor (USM) is used as a control object, and the USM obtains a driving force by transmitting energy generated by a vibration member via a frictional force. Assuming that energy management on the vibration member side including a power supply system is ideal, i.e., the mass point velocity of the vibration member is an amount proportional to some manipulation input, a transfer function up to the velocity of a driving member having an inertia becomes a constant system having a delay. Since there is nonlinearity (dead band) upon starting up or a slip phenomenon upon an abrupt change in velocity in association with the nature of frictional driving, the transfer function is generally expressed in the form of equation (19) including an idle time L:

$$\frac{Ke^{-Ls}}{1+\tau s} \quad (19)$$

Equation (16) described above is a specific one of such transfer functions. In a method of selecting a nominal model in this case, the way of approximation of the idle time is important. As described above, an approximation as high as a second-order denominator is considered to be practical. However, by increasing the order and matching the phase characteristic, a control system with a wider control band can be obtained.

In other words, by optionally and expansively changing an approximation model of the characteristic of a control object, control performance can be improved without requiring special design techniques. This is a new concept of the controller of this embodiment, and this embodiment can be utilized in an object which does not have a distinct characteristic such as a USM which suffers a large variation in parameter, a control process, and the like.

As described above, according to the present invention, a high-performance feedback controller having both target value followability and a disturbance suppression characteristic can be quickly provided with low cost. Since the arrangement is simple, easy maintenance is allowed. In addition, since the obtained controller has a high degree of freedom in specific setting, the controller can be applied to various kinds of objects.

What is claimed is:

1. A feedback controller which receives a target value r and a controlled variable y and supplies a manipulated variable u as a calculation output to a control object which has at least one input u as a manipulated variable and at least one output y as a controlled variable, and which has a transfer function $G_n(s)$, such as $y=G_n(s)u$, comprising:

(a) a compensator $G_c(s)$ whose calculation arrangement is given by the following formula:

$$u = G_c(s)(r-y)$$

where $$G_c(s) = \alpha/(G_n(0) - G_n(s))$$

using a nominal model $G_n(s)$ as an approximate characteristic of the control object, $G_n(0)$ corresponding to predetermined value and an arbitrary parameter $\alpha$, said compensator performing a compensation of a comparison deviation ($e = r - y$) between the target value r and the controlled variable y; and means responsive to the calculated manipulated variable for controlling the control object.

2. A controller according to claim 1, wherein said compensator $G_c(s)$ is expressed by the following transfer function using a low-frequency region inverse characteristic model H(s) of the nominal model $G_n(s)$:

$$G_c(s) = \alpha H(s)/(1 - H(s)G_n(s)).$$

3. A controller according to claim 1, wherein the parameter $\alpha$ is externally adjustable from an equipped input terminal.

4. A controller according to claim 2, wherein the parameter $\alpha$ is externally adjustable from an equipped input terminal.

5. A controller according to claim 1, wherein said compensator $G_c(s)$ calculates the manipulated variable u by receiving the deviation e.

* * * * *

UNITED STATES PATENT AND TRADEMARK OFFICE
CERTIFICATE OF CORRECTION

Page 1 of 2

PATENT NO. : 5,625,551
DATED : April 29, 1997
INVENTOR(S) : MITARAI, et al.

It is certified that error appears in the above-indentified patent and that said Letters Patent is hereby corrected as shown below:

Column 1

Line 20, "practically" should read --a practical--.
Line 52, "gain-phase" should read --gain•phase--.

Column 2

Line 10, "performance, and poor" should read --performance. Poor--.
Line 42, "showing-the" should read --showing the--.

Column 3

Line 6, "nonlinear" should --nonlinear.--.

Column 4

Line 14, "in-a" should read --in a--.
Line 54, "a" (first occurrence) should read --$\alpha$--.

Column 5

Line 25, "a" (first occurrence) should read --$\alpha$--.

UNITED STATES PATENT AND TRADEMARK OFFICE
CERTIFICATE OF CORRECTION

PATENT NO. : 5,625,551
DATED : April 29, 1997
INVENTOR(S) : MITARAI, et al.

It is certified that error appears in the above-indentified patent and that said Letters Patent is hereby corrected as shown below:

Column 7

Line 12, "means" should read --(b) means--.

Signed and Sealed this

Twenty-eighth Day of April, 1998

Attest:

BRUCE LEHMAN

*Attesting Officer*    *Commissioner of Patents and Trademarks*